United States Patent
Saripalli et al.

(10) Patent No.: US 7,818,604 B2
(45) Date of Patent: Oct. 19, 2010

(54) PIPELINED CLOCK STRETCHING CIRCUITRY AND METHOD FOR I2C LOGIC SYSTEM

(75) Inventors: Ramesh Saripalli, Tucson, AZ (US); Hugo Cheung, Tucson, AZ (US); Benoit Goas, Brest (FR)

(73) Assignee: Texas Instruments Incorporated, Dallas, TX (US)

(*) Notice: Subject to any disclaimer, the term of this patent is extended or adjusted under 35 U.S.C. 154(b) by 308 days.

(21) Appl. No.: 12/040,051

(22) Filed: Feb. 29, 2008

(65) Prior Publication Data
US 2008/0209252 A1 Aug. 28, 2008

Related U.S. Application Data

(63) Continuation of application No. 10/888,399, filed on Jul. 9, 2004, now abandoned.

(60) Provisional application No. 60/561,460, filed on Apr. 12, 2004.

(51) Int. Cl.
*G06F 1/04* (2006.01)
*G06F 1/12* (2006.01)
*G06F 5/06* (2006.01)

(52) U.S. Cl. .................................. 713/600
(58) Field of Classification Search .................. 713/600
See application file for complete search history.

(56) References Cited

U.S. PATENT DOCUMENTS

| 5,925,135 A | 7/1999 | Trieu et al. |
| 6,502,202 B1 * | 12/2002 | Song .......................... 713/501 |
| 6,874,047 B1 | 3/2005 | Duguay et al. |
| 2005/0114567 A1 | 5/2005 | Lambrache et al. |

OTHER PUBLICATIONS

The I2C-Bus Specification, Version 2.1, Philips Semiconductors, Jan. 2000, pp. 1-46.

\* cited by examiner

*Primary Examiner*—Thomas Lee
*Assistant Examiner*—Mohammed H Rehman
(74) *Attorney, Agent, or Firm*—John J. Patti; Wade J. Brady, III; Frederick J. Telecky, Jr.

(57) ABSTRACT

A system for increasing the data throughput of an I2C bus including a serial clock conductor (3) for conducting a serial clock signal (SCK) and a serial data conductor (2) for conducting a serial data signal (SDA) includes clock-stretching control circuitry (15) coupled to the serial clock conductor (3) for stretching the serial clock signal (SCK) by holding the serial clock conductor (3) at a predetermined level to cause a master device (10) to stop sending the serial clock signal, and circuitry (FIG. 3) in the slave device (5) for releasing stretching of the serial clock signal (SCK) in response to a determination by the slave device (5) that stretching of the serial clock signal (SCK) is unnecessary.

12 Claims, 6 Drawing Sheets

PIPELINED CLOCK STRETCHING CIRCUITRY AND METHOD FOR I2C LOGIC SYSTEM

This application is a continuation of U.S. patent application Ser. No. 10/888,399, filed 9 Jul. 2004, which is a non-provisional of U.S. provisional Patent Application No. 60/561,461, filed 12 Apr. 2004.

FIELD OF THE INVENTION

The present invention relates generally to pipeline circuitry for clock stretching in I2C logic systems.

BACKGROUND

A bus specification for I2C systems is described in detail in "THE I2C-BUS SPECIFICATION, VERSION 2.1, JANUARY 2000", which is incorporated herein by reference.

In the "slave mode" of a device of an I2C device, the serial clock signal SCK usually is automatically "stretched" after reception or transmission of a data byte by the I2C slave device. The automatic stretching of the clock signal SCK is required so that the slave device can read data that is received by it or prepare a new byte for transmission by the slave device. However, a problem of conventional I2C systems is that if a CPU (central processing unit) device of an I2C device in its slave mode is fast enough to process the data to be received or transmitted within the present byte transaction, the automatic stretching actually can be considered to be unnecessary and therefore to unnecessarily slow down the I2C bus speed.

Any time a prior art I2C device is in its slave mode, it "stretches" the clock signal (also referred to simply as the "clock") by holding the SCK clock conductor at a low level for a sufficiently long amount of time to allow the I2C device to perform its assigned function. (Note that an I2C device functioning in its slave mode is often referred to simply as a "slave", and that an I2C device functioning in its master mode is often referred to simply as a "master".) The amount of time that the clock SCK is stretched depends on the CPU of the slave and what it has to accomplish. The CPU of the slave receives data from an I2C device that is in its master mode, so once the slave receives the data from the master, the slave stretches the clock SCK to notify the master to not send any more data until the slave "releases" the clock signal conductor. The data received by the slave is shifted into a shift register. After the shift register is full, no more data can be received from the master until the data in the shift register is removed (which can be accomplished in various ways).

Every I2C device to which the present invention pertains needs to have a CPU. (However, some "stand-alone" I2C devices, such as an ADC, do not include a CPU). I2C devices to which the present invention pertains need to be able to operate in a slave mode (but not necessarily in a master mode). I2C devices are usually implemented at a certain protocol level that may be dependent on their main intended use. For example, an I2C device may be used in conjunction with an ADC so that the ADC performs an analog-to-digital conversion and the digital result is stored into the I2C device and then is transmitted via the SDA conductor when the master sends SCK clock pulses. In this case, the master would know that it wants to read, for example, three bytes of data from the slave (because the master knows that the slave is a 24 bit ADC). So the master would send a start condition on the SCK/SDA bus and send the serial clock SCK as needed in order to send three bytes on the SDA conductor, and then send a stop condition on the SCK/SDA bus. In this case, there would be no need for the slave to stretch serial clock SCK. If the master did not execute a read operation before the subject slave performed another analog-to-digital conversion while the slave still has unread data, the "unread" data could be cached, and later refreshed with the "new" conversion data. Note that the I2C device implementation in this example is very specific to its intended use in conjunction with the particular 24-bit ADC.

Thus, it is not always necessary for an I2C slave device (in its receive mode) to stretch the clock. In the foregoing 24-bit ADC example, it is not necessary to stretch the clock because if the first byte of conversion data is available, then all of the three bytes of conversion data will be available, so the slave will not need to implement a stretch of SCK. Therefore, the master can continue to generate the serial clock signal SCK and can read all three bytes without waiting for a STRETCH_RELEASE control signal from the slave. Or, if the master polls components of the slave, it might not need to stretch the clock. Generally, the CPU of an I2C slave device knows when it is finished with the present task and can send out a STRETCH_RELEASE control signal. Whether the slave needs to send a STRETCH_RELEASE control signal to the master depends on the specific situation. However, it should be understood that in most cases the slave actually does stretch the clock SCK.

Thus, there is an unmet need for an I2C system which can increase the data throughput rate on the I2C bus.

There also is an unmet need for an I2C system which avoids the need for a slave device to stretch the clock SCK if the function of the slave device can be completed within the present byte time interval.

SUMMARY

It is an object of the invention to provide an I2C system which can increase the data throughput rate on the I2C bus by avoiding unnecessary stretching of the serial clock signal SCK.

It is another object of the invention to provide an I2C system which avoids the need for a slave device to stretch the clock SCK if the function of the slave device can be completed within the present byte time interval.

It is another object of the invention to provide an I2C system which allows a system developer to have the flexibility of making a decision either to suppress a future stretch of the clock SCK before it happens or to allow the stretch of the clock SCK to begin and then release it.

Briefly described, and in accordance with one embodiment, the present invention provides a system for increasing the data throughput of an I2C bus including a serial clock conductor (3) for conducting a serial clock signal (SCK) and a serial data conductor (2) for conducting a serial data signal (SDA), the system including a master device (10) coupled to the serial clock conductor (3) and the serial data conductor (2) and a slave device (5) coupled to the serial clock conductor (3) and the serial data conductor (2). The slave device (5) includes clock-stretching control circuitry (15) coupled to the serial clock conductor (3) for stretching the serial clock signal (SCK) by holding the serial clock conductor (3) at a predetermined level to stretch the serial clock signal and for releasing the serial clock conductor (3) in response to a determination by the slave device (5) that stretching of the serial clock signal (SCK) is unnecessary.

In the described embodiment, the invention provides a system for controlling clock stretching in an I2C system including a serial clock conductor (3) conducting a serial clock signal SCK and a serial data conductor (2) conducting a serial data signal SDA, including a slave device (5) which includes a switch (17) coupled between the serial clock conductor (3) and a reference voltage conductor. A stretch release control circuit (15) is coupled to a slave CPU (11) and a control circuit (24) and also is coupled to a control electrode of the switch (17). The stretch release control circuit (15) performs the function of storing stretch release information during reception of a byte of information by the slave device (5), stretching the serial clock signal SCK by closing the switch (17), and discontinuing the stretching by opening the switch (17). The slave CPU (11) is coupled to the stretch release control circuit (15) and is operative, in response to a determination by the slave CPU (11) that the serial clock conductor (3) needs to be released as soon as reception of the byte of information is complete, to set the stretch release information to a value that causes the stretch release control circuit (15) to open the switch (17) as soon as the byte of information is received. A master device (10) is coupled to the serial clock conductor (3) and the serial data conductor (2) and performs the function of sending the byte of information on the serial data conductor (2), and performs the function of responding to stretching of the serial clock signal SCK to discontinue clock signal transmission and data transmission in response to release of the serial clock conductor (3) by continuing clock signal transmission and data transmission.

In the described embodiment, a control circuit (24) is coupled between the serial data conductor (2) and the slave CPU (11) to control operation of the slave CPU (11) in response to information received from the serial data conductor (2). The slave CPU (11) makes the determination that a predetermined stretching of the serial clock signal SCK needs to be released as soon as reception of the byte of information is complete. The switch (17) includes an MOS transistor coupled between the serial clock conductor (3) and the reference voltage conductor, a gate of the MOS transistor being coupled to an output of the stretch release control circuit (15).

In the described embodiment, the stretch release control circuit (15) includes a first circuit (131) responsive to a start stretch signal (START_STRETCH) produced by the control logic circuit (24) to produce an internal stretch signal (STRETCH_INTERNAL) to cause closing of the switch (17), and also includes a second circuit (124) for producing a stretch release signal (CANCEL_STRETCH) in response to the stored stretch release information, and also includes a third circuit (127) which functions to cause opening of the switch (17), wherein the third circuit (127) performs a logical ANDing operation on the internal stretch signal (STRETCH_INTERNAL) and the stretch release signal (CANCEL_STRETCH) to cause release of the serial clock conductor (3) in response to the internal stretch signal (STRETCH_INTERNAL).

DETAILED DESCRIPTION OF THE EXAMPLE EMBODIMENTS

Figure 1:
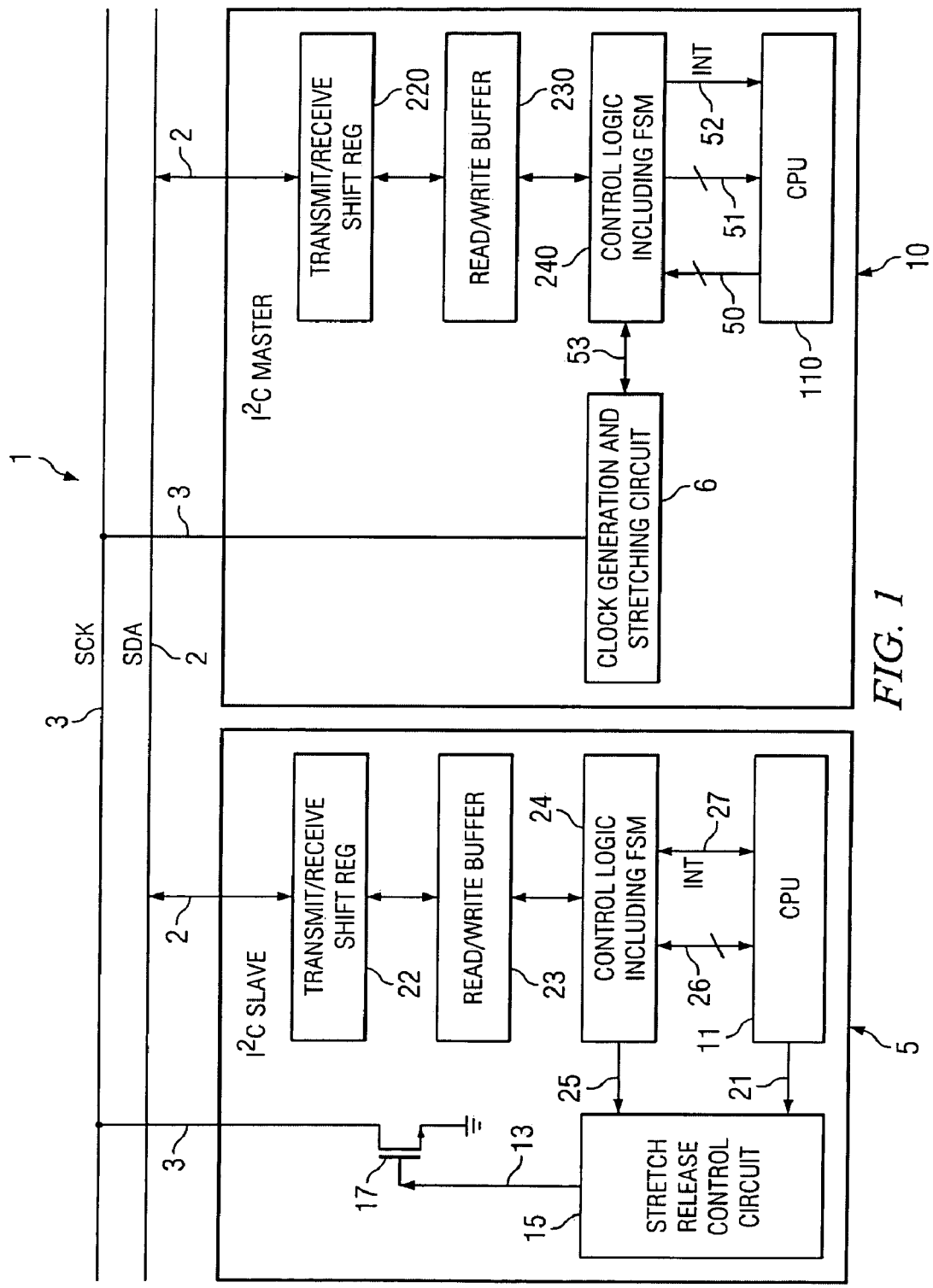
FIG. 1 is a block diagram of an I2C system including the serial clock stretch control circuitry of the present invention.

Referring to FIG. 1, I2C system 1 includes a serial data bus conductor 2 which conducts the serial clock data signal SDA and a serial clock conductor 3 that conducts the serial clock signal SCK. I2C system 1 includes an I2C slave device 5 and an I2C master device 10, both of which are connected to SCK conductor 3 and SDA conductor 2.

Slave device 5 includes an N-channel transistor 17 having its drain connected to SCK conductor 3 and its source connected to a ground conductor. The gate of transistor 17 is connected to a stretch release control circuit 15 (shown in detail in FIG. 5), which operates to "stretch" SCK by temporarily pulling SCK conductor 3 to ground, in response to control signals received on conductor 25 from control logic circuit 24 and on conductor 21 from a CPU (central processing unit) 11. Slave device 5 also includes a transmit/receive shift register 22 connected to SDA conductor 2. Transmit/receive shift register 22 is bidirectionally coupled by multiple conductors to a read/write buffer 23, which is coupled by multiple conductors to control logic circuit 24, which includes a finite state machine (FSM). Control logic circuit 24 can produce an interrupt signal INT on conductor 27, which is connected to an interrupt input of slave CPU 11. Control logic circuit 24 also is bidirectionally coupled via multiple control conductors 26 to slave CPU 11.

Master device 10 includes clock generation/stretching circuitry 6 which is coupled to SCK conductor 3. Clock generation/stretching circuitry 6 is bidirectionally coupled by multiple conductors 53 to a control logic circuit 240, which includes a conventional finite state machine. Control logic circuit 240 produces an interrupt signal INT on conductor 52, which is connected to an interrupt input of a CPU 110. Master CPU 110 receives control signals on multiple conductors 51 from control logic 240 and sends control signals on multiple conductors 50 to control logic circuit 240. Master device 10 also includes a transmit/receive shift register 220 which is bidirectionally coupled to SDA conductor 2. Transmit/receive shift register 220 is bidirectionally coupled by multiple conductors to a read/write buffer 230, which is bidirectionally coupled by multiple conductors to control logic circuit 240.

Figure 2:
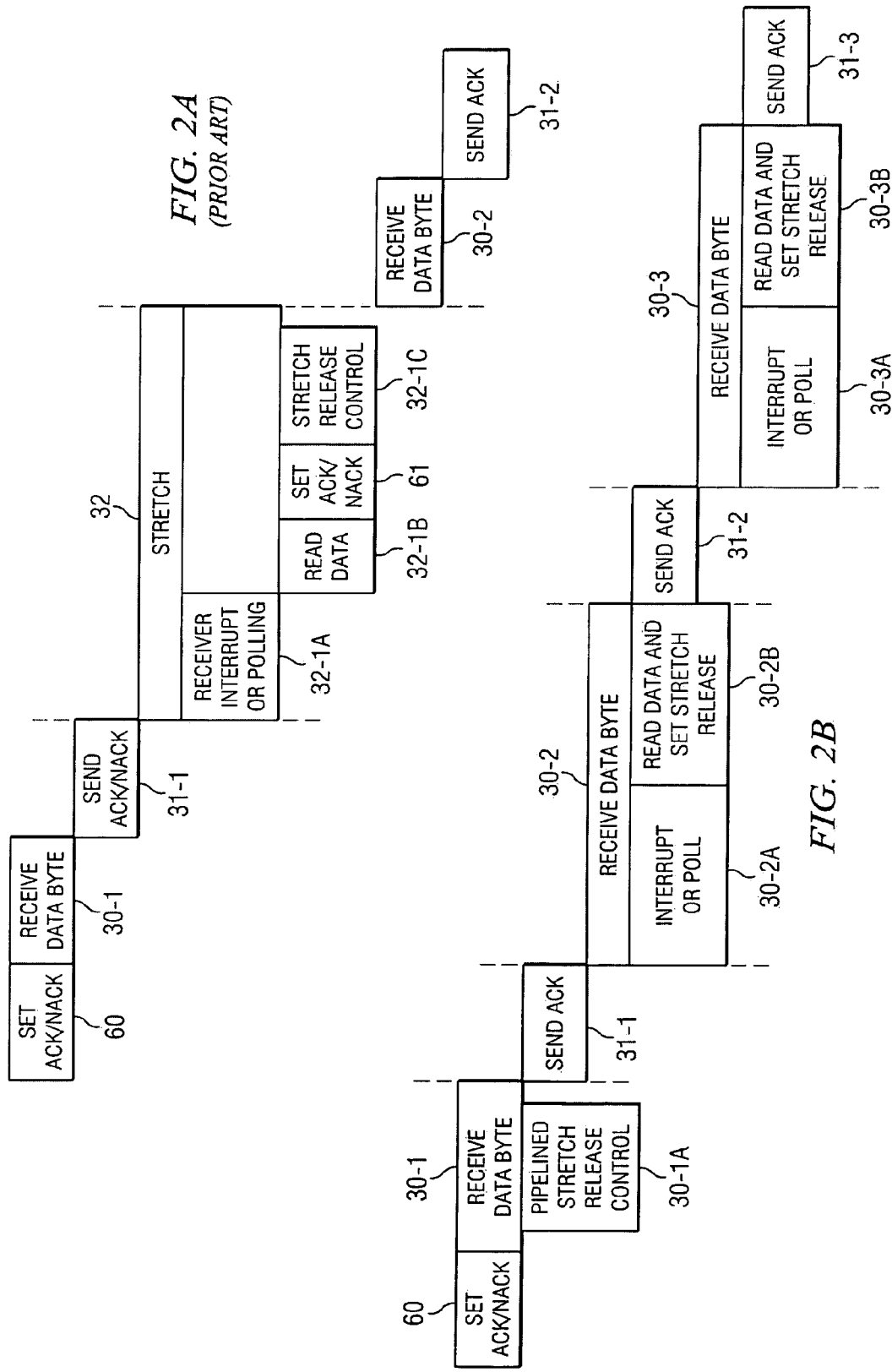
FIG. 2A is a timing diagram useful in explaining SCK stretching in a prior art I2C system.
FIG. 2B is a timing diagram useful in explaining the SCK stretching operation in an I2C system according to the present invention.

FIG. 2A is a sequential event diagram for illustrating the sequence of events during operation of a conventional I2C system including a master and a slave, and is described here as background for understanding operation of the present invention as subsequently described with respect to FIGS. 1 and 2B. In block 30-1 of FIG. 2A, the slave in a conventional I2C system receives a data byte transmitted by the master during the first eight SCK pulses of a 9-pulse data time-frame. Referring to block 31-1, the slave sends either an acknowledge signal ACK on the SDA conductor to let the master know that the slave has received the transmit data byte or a "not acknowledge" signal NACK to let the master know that the slave is not accepting or reading any data byte being sent by the master on the SDA conductor. (A NACK signal or condition actually is "sent" simply by not sending an ACK "0" level on the SDA conductor.)

The user software of the I2C system determines in advance, before the slave receives a data byte, whether the slave will send either an acknowledge signal ACK or a "not acknowledge" signal NACK on the SDA conductor during the ninth clock pulse of the data time frame after the data byte has been transmitted by the master. An acknowledge signal ACK or a "not acknowledge" signal NACK is always sent by the receiver, which in the present discussion is the slave. (Both a master and a slave can function in a receive mode or a send mode.) In every data time frame there are nine clock pulses, the first eight clock pulses of which are used by the master to send the data byte.

To summarize, during the ninth clock pulse a "0" is produced on the SDA conductor by the slave if an acknowledge signal ACK is to be sent by the slave, or alternatively, a "1" is produced on the SDA conductor by the slave if a "not acknowledge" signal NACK is to be sent by the slave to inform the master that the slave is not acknowledging that it received the data byte and is not accepting or reading the data byte being transmitted on the SDA conductor. If no slave is trying to pull the SDA conductor low (i.e., a NACK signal is being sent), the SDA conductor assumes a high value, i.e., a "1" level, and if the SDA conductor is low during the ninth clock pulse of the present data time frame, that means the slave is notifying the master that it has received the data byte sent by the master on the SDA conductor.

The user software can set up in advance whether the slave will send either an acknowledge signal ACK or a "not acknowledge" signal NACK on the SDA conductor during the ninth clock pulse of the present data time frame. This is indicated in block 60 of FIG. 2A. Thus, the slave, before receiving the data byte as indicated in block 30-1, has to make a decision as to whether or not the slave will respond by sending either a previously set up acknowledge signal ACK or "not acknowledge" signal NACK. After the data byte has been received by the slave, it will then send whichever of the ACK or NACK signals was previously set up.

Note that the user has to set up the ACK or NACK of the next transaction before it starts. In a preferred implementation the data time frame appears as 9 clock cycles, followed by stretching of CLK, followed by 9 clock cycles, followed by stretching of CLK, etc., wherein stretching of CLK can be avoided by the CPU if desired. In some implementations the slave could stretch the clock after 8 clock cycles and wait for the system to write the ACK/NACK bit wherein the data time frame appears as 8 clock (CLK) cycles, followed by stretching of CLK, followed by a clock cycle, followed by stretching of CLK, followed by 8 clock cycles, followed by stretching of CLK, followed by one clock cycle, etc. In another implementation, the data time frame could appear as one clock cycle, followed by stretching of CLK, followed by one clock cycle, followed by stretching of CLK, etc.

Referring to block 32-1A in FIG. 2A, after receiving the data byte and sending an acknowledge signal ACK, the I2C slave hardware does not know what its CPU will do next. For example, the slave may not yet have a next byte available to be sent to the master. What the slave can then do is to stretch clock SCK to indicate that the master must wait, and then the slave can interrupt the slave CPU and inform it that the slave has received the current byte and has sent an acknowledge signal ACK. The slave CPU can either service an interrupt or perform a polling operation to determine if the slave has received the data byte and to determine whether the slave can send an acknowledge signal. If the control logic sends an interrupt signal INT to the slave CPU, it reads the data byte that it has received, as indicated in block 32-1B. Once the data byte is read, the slave CPU, at the beginning of block 32-1C, also sets up the slave to send an acknowledge or a "not acknowledge" signal after it receives the next data byte. Then, as indicated in block 32-1C, the slave "releases the stretch" of SCK.

The above described process can be understood to be like a "handshaking" process wherein the slave stretches clock signal SCK to inform the master to not send any more SCK pulses, and the slave control logic then sends an interrupt INT to its own slave CPU and informs it about what has happened (i.e., informs the slave CPU that a data byte has been received and the clock SCK has been stretched). Then the slave CPU reads that data byte and sets up the appropriate conditions for the next event to happen (i.e., the slave CPU sets up the slave to send either an acknowledge signal or a "not acknowledge" signal after the next data byte is received, after the present stretch of SCK has been released). Next, when the slave is ready it releases the stretch of SCK. The master then can continue control of clock signal SCK and data signal SDA.

Note that after the slave has received the first data byte, it does not always need to set up the acknowledge/"not acknowledge" decision again for each of the multiple successive data bytes to be received by the slave. For example, if the slave CPU wants the slave to receive 10 successive data bytes, the slave does not need to set up the acknowledge/"not acknowledge" decision again for each of the remaining 9 data bytes. The ACK/NACK bit (i.e., the ninth bit of each data time frame) remains set until it is cleared. The slave therefore will send an acknowledge signal ACK for each of the 10 data bytes without the acknowledge/"not acknowledge" bit being reset. After the stretch release referred to in block 32-1C of FIG. 2A, the master then can send the next data byte on the SDA conductor, and the process in the slave is repeated for the next data byte, as indicated in blocks 30-2 and 31-2.

Note that above described FIG. 2A shows the sequence of events in a prior art I2C system. FIG. 2B includes a similar sequential event diagram which shows the pipelined stretch release technique of the present invention.

Referring now to FIGS. 1 and 2B, and in accordance with the present invention, the stretch release control can determine that slave 5 does not need to stretch the clock, as indicated in block 30-1A, and can cancel the stretch of SCK immediately after it begins is set up during receiving of the data byte by slave 5. (Or alternatively, the stretch release control can be set up during the time of block 60 prior to receiving the data byte, i.e., at the same time as the set up of the acknowledge/"not acknowledge" bit.) Stated differently, the set up of the stretch release control (that is, the set up of the stretch cancellation event) which occurs in block 32-1C of "prior art" FIG. 2A is "shifted" to an earlier time, to the time interval of block 30-1A in FIG. 2B.

After the acknowledge signal ACK is sent as indicated in block 31-1, slave 5 executes the "stretch cancellation" that was previously set up in block 30-1A. The stretch release function of block 30-1A of FIG. 2B is executed immediately after the ACK signal is sent in block 31-1 so as to immediately cancel the stretch release that otherwise would be completed (i.e., that would occur in the manner shown in block 32 of "prior art" FIG. 2A). That is, as soon as the stretch begins to occur, the stretch release control circuit 15 of FIG. 1 releases it.

Stated differently, in FIG. 2B, the stretch release control or cancellation in block 30-1A is "pipelined", i.e., it is set up in stretch release control circuit 15 at a time substantially before the stretch release cancellation is actually executed to prevent the stretch of SCK from continuing. (Note that if slave 5 sends a "not acknowledge" signal NACK, then there is no stretch of SCK as there is no need for it, because after slave 5 stops recognizing or receiving data by sending a "not acknowledge" signal NACK, it cannot receive more data until the next "I2C start" condition occurs. Slave 5, by sending a "not acknowledge", in effect disconnects itself from SDA conductor 2. Therefore, after slave 5 sends a "not acknowledge" signal, it does not stretch the clock, because even if master 10 sends the clock signal, slave 5 doesn't "accept" it.)

When the pipelined stretch release control that is set up according to block 30-1A is later executed at the end of the time duration of "acknowledge" block 30-1 in FIG. 2B, slave 5 immediately releases the stretch that is automatically imposed on SCK conductor 3 at the end of block 31-1 to prevent the stretch from continuing. The next "receive data byte" operation then occurs as indicated in block 30-2 of FIG. 2B. During the time interval of block 30-2, slave CPU 11 can be interrupted, or a polling operation can be performed as indicated in block 32-2A, so that slave CPU 11 can determine that the data byte has been received by slave 5, which recognizes that it has to read that data byte and performs the read data operation indicated in block 30-2B. (The process of reading a data byte by slave 5 includes the slave CPU 11 performing the step of reading R/W buffer 23.) Slave CPU 11 also sets up the pipelined stretch release control as indicated in block 30-2B so the clock SCK will not be stretched at the end of the present data time frame, i.e., at the end of the "send ACK" block 31-2 of FIG. 2B. Therefore, the stretch release executed at the end of "send ACK" block 31-2 is again immediately canceled by the pipelined stretch release control set up earlier in block 30-2B.

Figure 3:
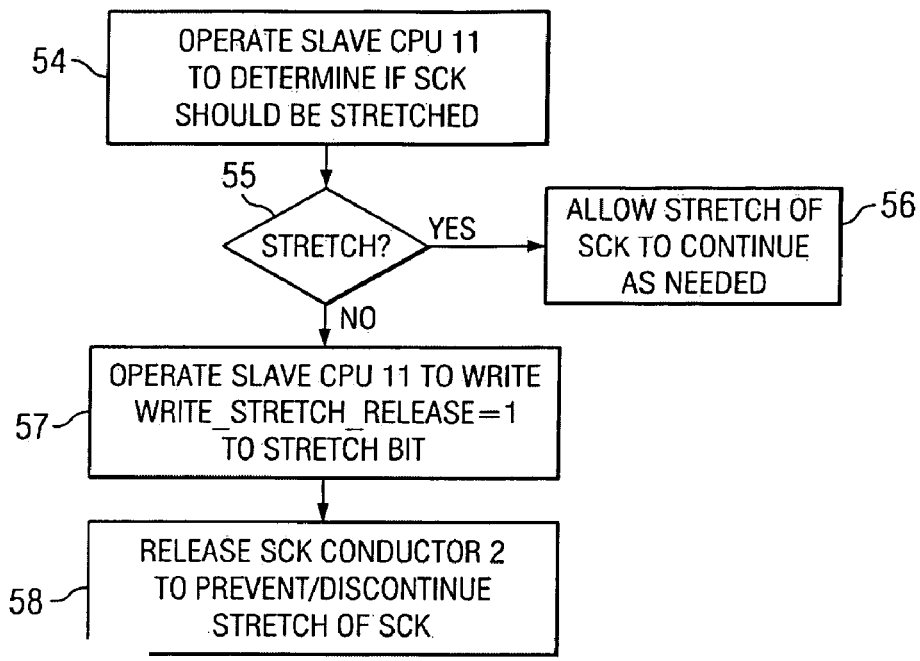
FIG. 3 is a flow chart which indicates how the CPU 11 in FIG. 1 determines whether it is necessary to stretch the SCK clock signal.

FIG. 3 is a generalized flow chart that shows how slave CPU 11 determines whether or not it is necessary to stretch the clock SCK. Referring to block 54 of FIG. 3, slave CPU 11 is operated to determine if serial clock SCK needs to be stretched according to criteria appropriate to the present circumstances. (For example, slave CPU 11 can be operated to determine if slave 5 operates fast enough to perform its required function before the next data time frame.) Then the program being executed by slave CPU 11 goes to decision block 55 and determines whether the determination of block 54 is that SCK should be stretched. If this determination is affirmative, the program goes to block 56 and allows SCK to be stretched in the conventional manner. After stretching at the end of the bytes transaction, the firmware can review the situation and can decide whether to stretch or not stretch by moving to block 55. However, if the determination of decision block 55 is negative, the program goes to block 57 and operates slave CPU 11 to generate the signal WRITE_STRETCH_RELEASE=1. The program then goes to block 58 and causes stretch release control circuit 15 to release SCK conductor 2 so as to prevent or discontinue stretching of serial clock SCK. Once the stretch is released, the CPU can decide for the next byte by moving to block 55. Thus, the present invention can avoid stretching serial clock signal SCK whenever appropriate.

The automatic stretching of serial clock SCK ordinarily begins regardless of whether CPU 11 is fast enough to read the received byte before the arrival of the next byte or to write a new byte into a R/W buffer 230 in FIG. 1. The pipelined circuit configuration including stretch release circuit 15 can produce the WRITE_STRETCH_RELEASE=1 signal if a pipelined stretch release bit is set up in advance (i.e., pipelined) as indicated in block 30-1A of FIG. 2B before the completion of the present byte transfer, or even before the beginning of the present byte transfer, so that serial clock conductor 2 is released from the automatically-started stretch immediately after completion of the present byte transfer. The completion of the automatic stretch of serial clock SCK therefore is avoided whenever slave CPU 11 makes a determination as described with reference to the flow chart of FIG. 3 that stretching is not needed, and therefore no wait time is imposed on I2C bus 2,3.

Figure 4:
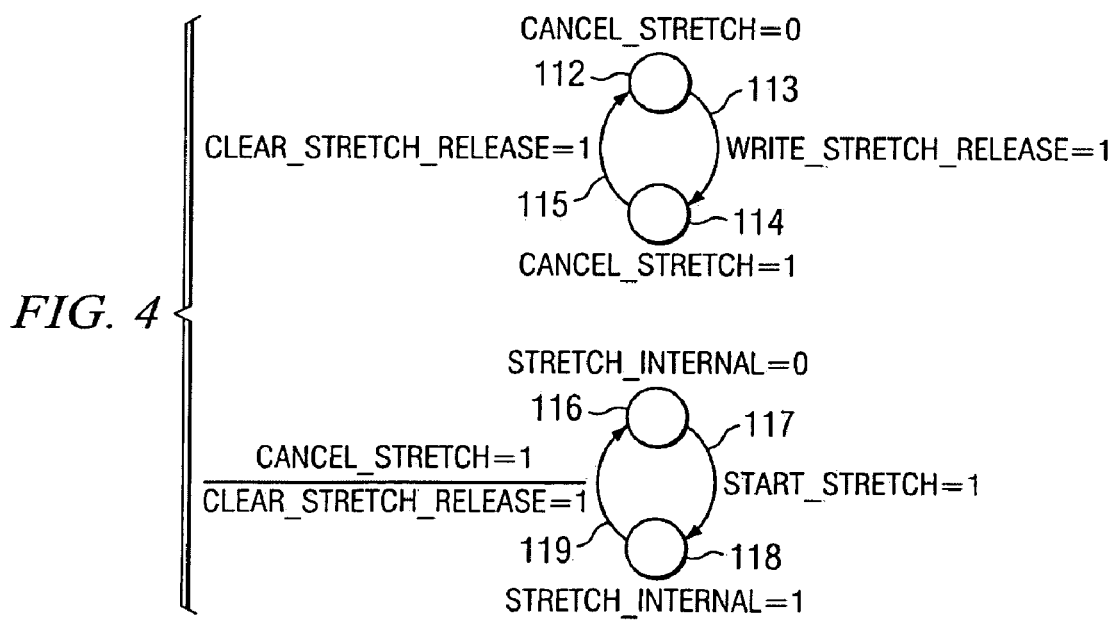
FIG. 4 is a diagram of a state machine of a preferred embodiment of the invention.
Figure 5:
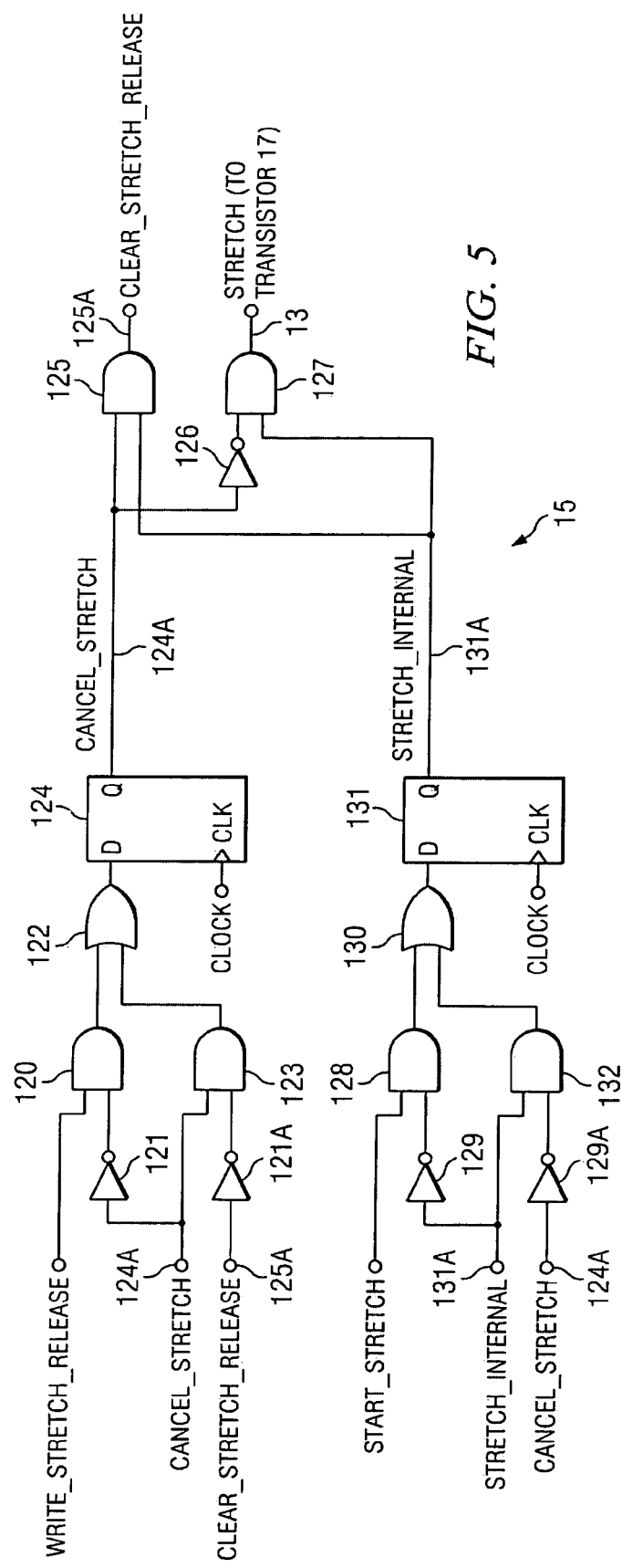
FIG. 5 is a logic diagram of an implementation of the state machine of FIG. 4.
Figure 6A:
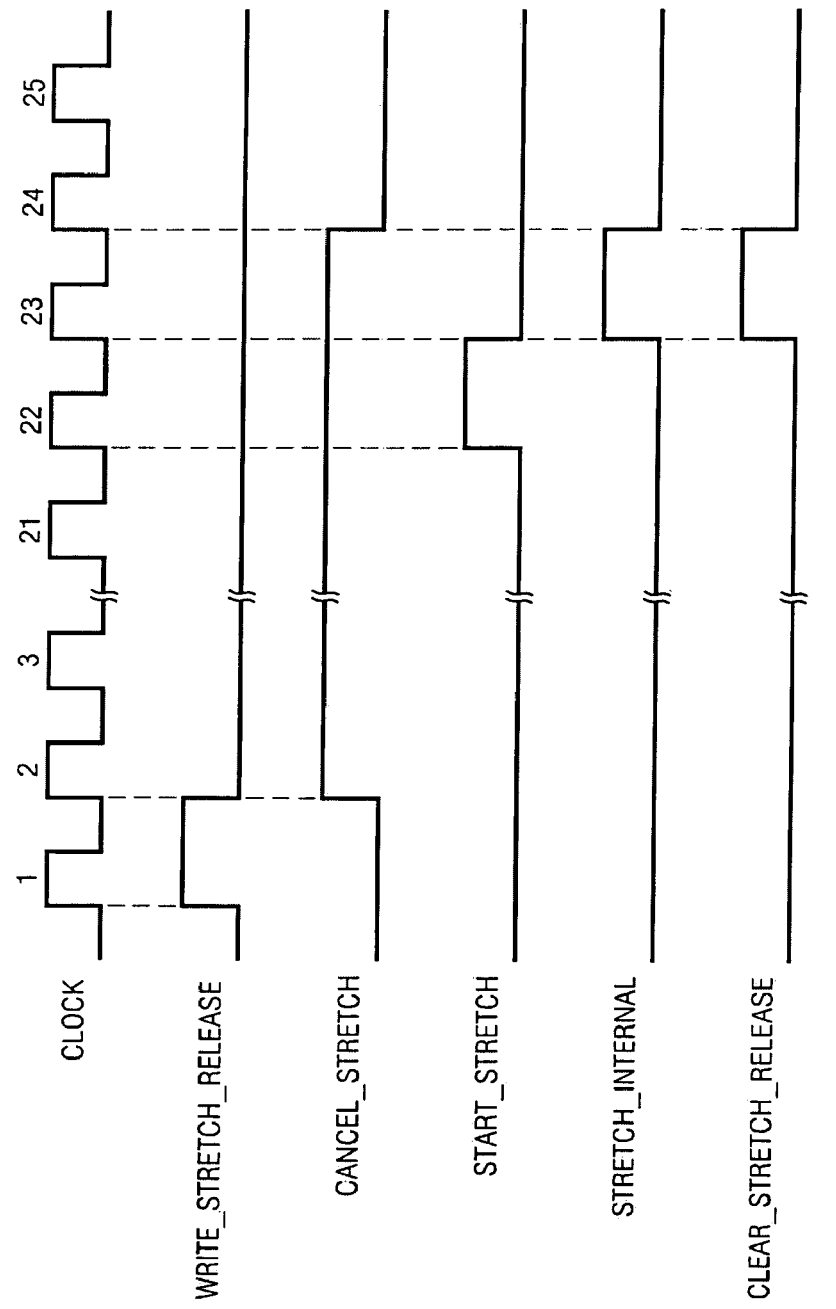
FIGS. 6A and 6B are timing diagrams useful in explaining the operation of the circuit of FIG. 5.
Figure 6B:
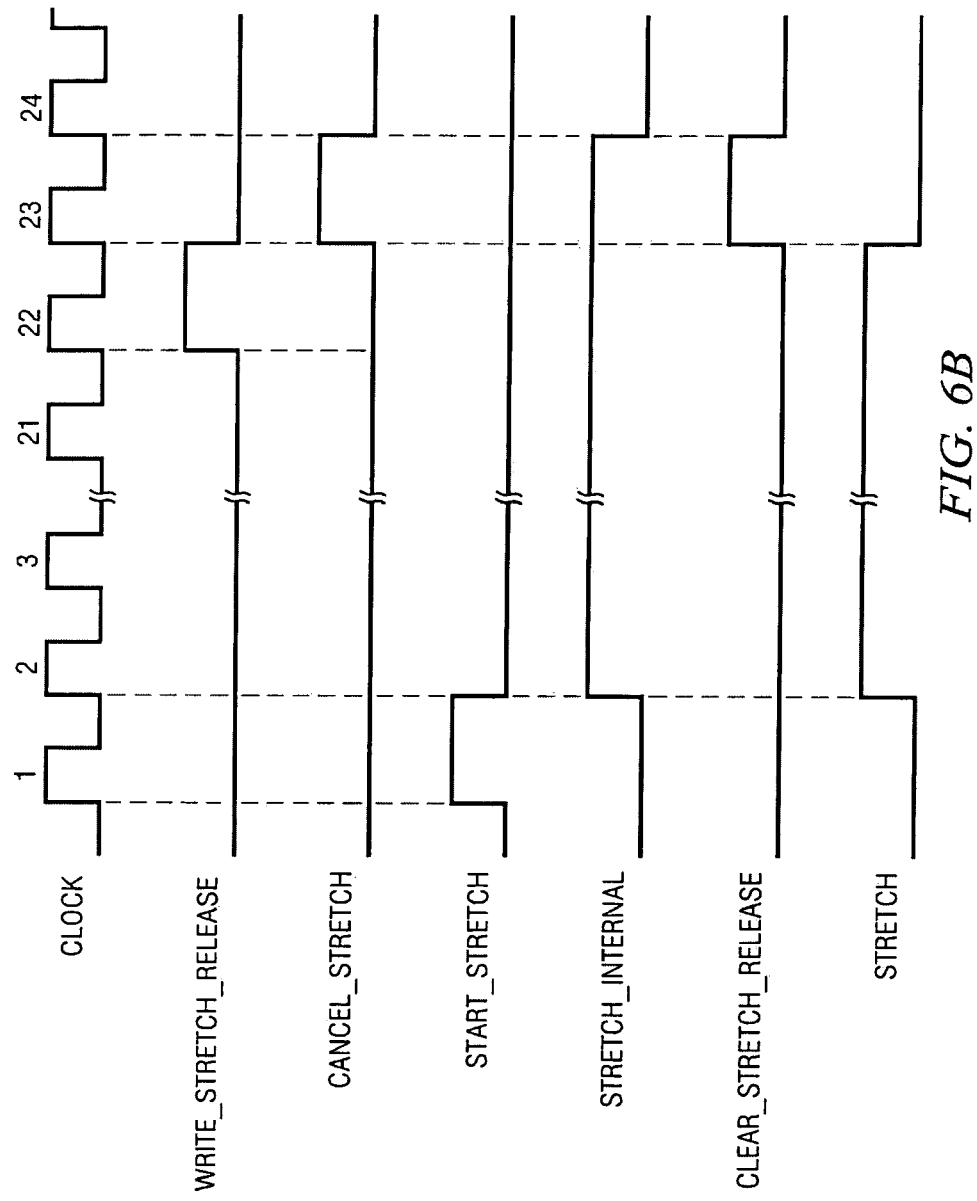

FIGS. 4, 5, 6A and 6B illustrate the structure and operation of a preferred embodiment of stretch release control circuit 15 of FIG. 1 which allows both conventional operation for stretching and releasing of CLK and automatic cancellation of the stretch, depending on which mode of operation is set up in advance by slave CPU 11. Specifically, FIG. 4 illustrates a state machine of the preferred embodiment, FIG. 5 illustrates an implementation of the state machine, and FIGS. 6A and 6B illustrate the operation.

Referring to FIG. 4, the illustrated state diagram indicates an initial state 112 corresponding to a signal condition CANCEL_STRETCH=0 which is changed to a state 114 corresponding to the signal condition CANCEL_STRETCH=1 in response to a signal condition WRITE_STRETCH_RELEASE=1, and which is changed back to the initial 112 state in response to a signal condition CLEAR_STRETCH_RELEASE=1. The state diagram of FIG. 4 also indicates an initial state 116 corresponding to a signal condition STRETCH_INTERNAL=0 which is changed to a state 118 in response to a signal condition START_STRETCH=1, and which is changed back to the initial state 116 in response to the condition CANCEL_STRETCH=1. During the transition from state 114 to state 112, the signal condition CLEAR_STRETCH_RELEASE is set to 1.

Referring to FIG. 5, stretch release control circuit 15 is a preferred implementation of the state machine represented by the state diagram of FIG. 4. The stretch release control circuit 15 includes an AND gate 120 having one input coupled to the signal WRITE_STRETCH_RELEASE and another input coupled to the output of an inverter 121. The input of inverter 121 is connected by conductor 124A to the signal CANCEL_STRETCH, which is also connected to one input of an AND gate 123, the other input of which is connected to the output of an inverter 121A, the input of which is connected by conductor 125A to CLEAR_STRETCH_RELEASE. The outputs of AND gates 120 and 123 are connected to the inputs of OR gate 122, the output of which is connected to the D input of a D-type flip-flop 124. The CLK input of flip-flop 124 is connected to a suitable clock signal CLOCK. (Flip-flop 124 stores the states 112 and 114 of the state diagram shown in FIG. 4.) The Q output of flip-flop 124 is coupled to conductor 124A and produces the signal CANCEL_STRETCH thereon.

Conductor 124A is connected to one input of an AND gate 125 and to the input of an inverter 126, the output of which is connected to an AND gate 127, the output of which produces the signal STRETCH on conductor 13 of FIG. 1. The output of AND gate 125 produces CLEAR_STRETCH_RELEASE on conductor 125A.

The signal START_STRETCH is connected to one input of an AND gate 128, the other input of which is connected to the output of an inverter 129. The input of inverter 129 is connected by a conductor 131A TO STRETCH_INTERNAL, which is also connected to one input of another AND gate 132, the other input of which is connected to the output of an inverter 129A. The input of inverter 129A is connected by a conductor 124A to CANCEL_STRETCH. The outputs of AND gates 128 and 132 are connected to the inputs of an OR gate 130, the output of which is connected to the D input of a D-type flip-flop 131, the output of which produces STRETCH_INTERNAL on conductor 131A. Conductor 131A is connected to the other inputs of AND gates 125 and 127. Note that only one of AND gates 123 and 120 can be enabled at a time, and similarly, only one of AND gates 128 and 132 can be enabled at a time.

Flip-flop 124 stores one or the other of states 112 or 114 shown in state diagram of FIG. 4, depending on the values of the signals WRITE_STRETCH_RELEASE and CLEAR_

STRETCH_RELEASE. If flip-flop 124 stores a "0" (i.e., is in state 112), then if WRITE_STRETCH_RELEASE goes to a "1", then the Q output of flip-flop 124 goes to a "1" (i.e., to state 114). The feedback via conductor 124A from the Q output of flip-flop 124 to the input of AND gate 123 prevents flip-flop 124 from reacting to the signal condition WRITE_STRETCH_RELEASE=1 if flip-flop 124 is storing a "1".

Only one condition can cause the state of flip-flop 124 to go from a "1" to a "0", and that is the condition that CLEAR_STRETCH_RELEASE=1. If the user sets up the next cycle so that no stretching of CLK is to occur, the user causes slave CPU 11 to set the condition WRITE_STRETCH_RELEASE=1 in a suitable register bit. Initially, when a "0" is stored in flip-flop 124, the "0" on the Q output of flip-flop 124 is applied to the input of inverter 121, so AND gate 120 is already enabled when WRITE_STRETCH_RELEASE goes to a "1" at the beginning of CLOCK pulse 1 in FIG. 6A. Therefore, that "1" propagates through AND gate 120 and OR gate 122 to the D input of flip-flop 124.

Consequently, the state of flip-flop 124 and CANCEL_STRETCH switch from "0" to "1" at the beginning of CLOCK pulse 2. Then the feedback via conductor 124A to inverter 121 causes it to apply a "0" level to one input of AND gate 120, which disables it. Therefore, any occurrence of the signal WRITE_STRETCH_RELEASE=1 does not propagate through AND gate 120 and OR gate 122 while a "1" is stored in flip-flop 124. However, the "1" on conductor 124A enables AND gate 123.

The "1" stored in flip-flop 124 also appears on one input of AND gate 125 and causes inverter 126 to produce a "0" at one input of AND gate 127. That "0" causes the signal STRETCH to remain at a "0" level, as shown in FIG. 6A. Later, after a transaction involving slave CPU 11 has occurred during the period between CLOCK pulses 2 and 22 in FIG. 6A, at the time of CLOCK pulse 22 slave CPU 11 determines that is time to start a stretch of the I2C clock SCK and produces the signal START_STRETCH=1 at the leading edge of CLOCK pulse 22. STRETCH_INTERNAL is already at a "0" (state 116 in FIG. 4) at that time, so the output of inverter 129 is a "1" which is applied to one input of AND gate 128. Therefore, when the condition START_STRETCH=1 occurs at the leading edge of clock pulse 22, the "1" value of START_STRETCH propagates through AND gate 128 because it is enabled by the "1" at the output of inverter 129. The "1" value of START_STRETCH therefore propagates through OR gate 130 to the D input of flip-flop 131. This causes a "1" to be latched into flip-flop 131 at the leading edge of CLOCK pulse 23, thereby producing the value STRETCH_INTERNAL=1 at the output of flip-flop 131 (state 118 in FIG. 4) at the leading edge of CLOCK pulse 23. This "1" causes inverter 129 to disable AND gate 128, and enables AND gate 132.

The signal CANCEL_STRETCH is still at a "1" level, so the output of inverter 129A is a "0". Therefore the outputs of both AND gates 128 and 132 are at a "0" levels, so the output of OR gate 130 applies a "0" level at the D input of flip-flop 131. Therefore at the leading edge of CLOCK pulse 24 a "0" is latched into flip-flop 131, causing STRETCH_INTERNAL=0 to appear on conductor 131A, which disables AND gate 132 and enables AND gate 128.

At that the same time (i.e., at the leading edge of CLOCK pulse 24) STRETCH_INTERNAL and CLEAR_STRETCH_RELEASE go to a "0" level and CANCEL_STRETCH also goes to "0". Therefore, stretch release control circuit 15 is back at its original state, with CANCEL_STRETCH and STRETCH_INTERNAL both at a "0" level.

Therefore, stretch release control circuit 15 waits for the next time that the user generates WRITE_STRETCH_RELEASE=1.

At no time during the above operation does stretch release control circuit 15 have both inputs of AND gate 127 at a "1" level (i.e., at no time during the above described operation is CANCEL_STRETCH equal to "0" at the same time that STRETCH_INTERNAL equal to a "1"). Therefore, STRETCH is at a "0" level during the entire cycle shown in FIG. 6A.

The timing diagram of FIG. 6B shows the operation of STRETCH control circuit 15 if the user causes slave CPU 11 to set up a condition in advance to cause conventional I2C operation in which an automatic stretch of SCK is produced during the next data time frame, followed by a stretch release operation at a time determined by slave CPU 11. In this case, the slave hardware produces a signal START_STRETCH=1 during CLOCK cycle 1, as shown in FIG. 6B. Since STRETCH_INTERNAL is at a "0", inverter 129A produces a "1" which enables AND gate 128, so that "1" propagates through AND gate 128 and OR gate 130 to the D input of flip-flop 131. This causes flip-flop 131 to produce STRETCH_INTERNAL=1 at the time of the leading edge of CLOCK pulse 2.

Then, since CANCEL_STRETCH=0 and STRETCH_INTERNAL=1, both inputs of AND gate 127 are at a "1" level, and the STRETCH signal on conductor 13 goes to a "1" at the leading edge of CLOCK pulse 2.

When the slave hardware eventually provides a WRITE_STRETCH_RELEASE=1 signal later, for example at the leading edge of CLOCK pulse 22 in FIG. 6B, this causes the CANCEL_STRETCH signal to go from its "0" level to a "1" level because inverter 121 enables AND gate 120 while CANCEL_STRETCH is at the "0" level. That WRITE_STRETCH_RELEASE=1 signal therefore propagates through AND gate 120 and OR gate 122 to the D input of flip-flop 124, which latches CANCEL_STRETCH=1 at the leading edge of CLOCK pulse 23. This causes inverter 126 to disable AND gate 127, thereby terminating STRETCH at the leading edge of CLOCK pulse 23. Note that the CLEAR_STRETCH_RELEASE=1 produced by AND gate 125 in response to the CANCEL_STRETCH=1 and the STRETCH_INTERNAL=1 signals causes the CANCEL_STRETCH signal to return to a "1" level at the beginning of CLOCK pulse 24, and CANCEL_STRETCH causes STRETCH_INTERNAL to return to a "0" level.

Thus, the circuit shown in FIG. 5 operates both in accordance with the present invention if no stretch is desired and also performs like conventional prior art I2C circuitry by producing a stretch signal if desired and releasing it when desired. Of course, those skilled in the art could provide various other implementations of the state machine of FIG. 4.

Thus, the described system provides a pipelined stretch release technique in which the pipelined stretch release control circuit 15 operates to disable or discontinue the SCK stretch operation when a determination is made that slave CPU 11 can complete its present function during the present byte transfer time, but also enables the usual automatic complete SCK stretch operation to occur if a determination is made that stretching is not needed. This flexibility increases the data throughput rate of I2C bus 2,3.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

What is claimed is:

1. A system for increasing the data throughput of an I²C bus including a serial clock conductor for conducting a serial clock signal and a serial data conductor for conducting a serial data signal, the system comprising:
   a slave device coupled to the serial clock conductor and the serial data conductor, wherein the slave device is operable to provide an acknowledge of a transfer from a master device via the serial data conductor, and wherein the slave device includes:
      a clock stretch control circuit that is operable to:
         hold the serial clock conductor at a predetermined level to cause a master device to stop sending the serial clock signal for a stretch period extending beyond the acknowledge upon determining that a need for additional time exists, and
         release the serial clock conductor approximately coincident with the acknowledge upon determining that no need for additional time exists;
      a switch coupled between the serial clock conductor and a reference voltage conductor, and wherein the switch is controlled by an output of the clock stretch control circuit; and
      a processor, wherein the clock stretch control circuit includes a first circuit responsive to a start stretch signal to produce an internal stretch signal for causing closing of the switch, wherein the clock stretch control circuit further includes a second circuit for producing a stretch release signal in response to stretch release information produced by the processor, and wherein the clock stretch control circuit further includes a third circuit that functions to cause opening of the switch at least in part in response to the stretch release signal.

2. The system of claim 1, wherein the processor determines prior to receiving the transfer that the acknowledge will be provided.

3. The system of claim 2, wherein the clock stretch control circuit is coupled between the serial data conductor and the processor to control operation of the processor in response to the transfer.

4. The system of claim 1, wherein the processor determines prior to providing the acknowledge that either a need for additional time exists or no need for additional time exists.

5. The system of claim 4, wherein the processor determines that no need for additional time exists after reception of the transfer is complete.

6. The system of claim 1, wherein, upon determining that no need for additional time exists, the clock stretch control circuit is operable to release the serial clock conductor immediately after the acknowledge.

7. The system of claim 1, wherein the switch includes an MOS transistor coupled between the serial clock conductor and the reference voltage conductor, a gate of the MOS transistor being driven by the output of the clock stretch control circuit.

8. The system of claim 1, wherein the third circuit performs a logical ANDing operation on the stretch release signal and the internal stretch signal to cause release of the serial clock conductor.

9. The system of claim 1, wherein the slave device further includes a shift register and a buffer circuit coupling the serial clock conductor to the clock stretch control circuit.

10. The system of claim 1, wherein the slave device includes both an I²C master mode and an I²C slave mode.

11. The system of claim 1, wherein the master provides the serial clock signal intermittently at a single frequency.

12. A system for controlling clock stretching in an I²C system including a serial clock conductor conducting a serial clock signal and a serial data conductor conducting a serial data signal, the system comprising:
   a master device coupled to the serial clock conductor and the serial data conductor, wherein the master provides the serial clock signal intermittently at a single frequency;
   a slave device coupled to the serial clock conductor and the serial data conductor, wherein the slave device is operable to provide an acknowledge of a transfer from the master device via the serial data conductor, and wherein the slave device includes:
      a clock stretch control circuit that is operable to:
         hold the serial clock conductor at a predetermined level to cause a master device to intermittently stop sending the serial clock signal for a stretch period extending beyond the acknowledge upon determining that a need for additional time exists, and
         release the serial clock conductor immediately after the acknowledge upon determining that no need for additional time exists;
      a processor, wherein the processor determines prior to receiving the transfer that the acknowledge will be provided, and wherein the processor determines prior to providing the acknowledge that either the need for additional time exists or that no need for additional time exists; and
      a switch coupled between the serial clock conductor and a reference voltage conductor, wherein the switch is controlled by an output of the clock stretch control circuit, and wherein the clock stretch control circuit includes a first circuit responsive to a start stretch signal to produce an internal stretch signal for causing closing of the switch, wherein the clock stretch control circuit further includes a second circuit for producing a stretch release signal in response to stretch release information produced by the processor, and wherein the clock stretch control circuit further includes a third circuit that functions to cause opening of the switch at least in part in response to the stretch release signal.

* * * * *